(12) United States Patent
Vadera et al.

(10) Patent No.: US 10,069,759 B1
(45) Date of Patent: Sep. 4, 2018

(54) MACHINE LEARNING RESOURCE ALLOCATOR

(71) Applicants: Sameer Vadera, Alexandria, VA (US); Katherine S. Gaudry, Bethesda, MD (US); Thomas D. Franklin, Englewood, CO (US)

(72) Inventors: Sameer Vadera, Alexandria, VA (US); Katherine S. Gaudry, Bethesda, MD (US); Thomas D. Franklin, Englewood, CO (US)

(73) Assignee: TRIANGLE IP, INC., Englewood, CO (US)

( * ) Notice: Subject to any disclaimer, the term of this patent is extended or adjusted under 35 U.S.C. 154(b) by 0 days.

(21) Appl. No.: 15/882,948

(22) Filed: Jan. 29, 2018

Related U.S. Application Data

(60) Provisional application No. 62/451,373, filed on Jan. 27, 2017, provisional application No. 62/535,456, filed on Jul. 21, 2017.

(51) Int. Cl.

| | |
|---|---|
| *G06F 15/173* | (2006.01) |
| *H04L 12/911* | (2013.01) |
| *G06N 99/00* | (2010.01) |
| *H04L 12/26* | (2006.01) |
| *H04L 12/24* | (2006.01) |
| *G06N 5/04* | (2006.01) |

(52) U.S. Cl.
CPC ............ *H04L 47/823* (2013.01); *G06N 5/04* (2013.01); *G06N 99/005* (2013.01); *H04L 41/147* (2013.01); *H04L 43/045* (2013.01)

(58) Field of Classification Search
None
See application file for complete search history.

(56) References Cited

U.S. PATENT DOCUMENTS

| | | | |
|---|---|---|---|
| 5,875,431 A | 2/1999 | Heckman et al. | |
| 6,219,649 B1 * | 4/2001 | Jameson | G06Q 10/06 700/99 |
| 6,622,128 B1 | 9/2003 | Bedell et al. | |
| 6,973,441 B1 | 12/2005 | Jaggi | |
| 7,076,439 B1 | 7/2006 | Jaggi | |
| 7,634,415 B2 | 12/2009 | Baker et al. | |
| 7,813,978 B2 | 10/2010 | Abbott et al. | |
| 7,958,023 B1 | 6/2011 | Shibayama | |
| 8,108,428 B1 | 1/2012 | Wencel et al. | |
| 8,214,320 B2 | 7/2012 | Derry et al. | |
| 8,244,610 B2 | 8/2012 | Ulrich et al. | |
| 8,311,909 B2 | 11/2012 | Helfer et al. | |
| 8,560,465 B2 * | 10/2013 | Jeong | G06N 5/02 706/12 |
| 8,768,749 B2 | 7/2014 | Paulmann | |

(Continued)

*Primary Examiner* — Mohamed Ibrahim
(74) *Attorney, Agent, or Firm* — Kilpatrick Townsend & Stockton LLP

(57) ABSTRACT

A method and system for allocation of resources is disclosed. Authenticated and unauthenticated data sources are mined to determine event vectors from a large number of cases that follow a branched processing model. A current event vector is compared to the mined event vectors with machine learning to predict future nodes for the current event vector. Historical resource allocations for the mined event vectors are used to determine resource allocation for the current event vector over time.

20 Claims, 15 Drawing Sheets

(56) References Cited

U.S. PATENT DOCUMENTS

| | | | |
|---|---|---|---|
| 2002/0107914 A1* | 8/2002 | Charisius | G06Q 10/06 709/203 |
| 2007/0214082 A1 | 9/2007 | Helfer et al. | |
| 2012/0303497 A1 | 11/2012 | Derry | |
| 2013/0211989 A1 | 8/2013 | Derry | |
| 2013/0231971 A1 | 9/2013 | Bishop et al. | |
| 2014/0055458 A1* | 2/2014 | Bogdany | G06T 11/206 345/440 |
| 2015/0121185 A1 | 4/2015 | Holt et al. | |
| 2015/0160979 A1* | 6/2015 | Moffitt | G06F 9/5066 718/104 |
| 2016/0042460 A1 | 2/2016 | Hudak et al. | |
| 2016/0217428 A1 | 7/2016 | Shaaban et al. | |

* cited by examiner

MACHINE LEARNING RESOURCE ALLOCATOR

This application claims the benefit of and is a non-provisional of U.S. Provisional both Application Ser. No. 62/451,373 filed on Jan. 27, 2017 and Application Ser. No. 62/535,456 filed on Jul. 21, 2017, which are hereby expressly incorporated by reference in their entirety for all purposes.

BACKGROUND

This disclosure relates in general to machine learning systems and, but not by way of limitation, to automatic resource allocation analysis amongst other things.

There are many issues with allocation of resources. Recently, the availability of large historical data sets of past allocations of resources allows big data analysis. These data sets are vast, but difficult to gather meaningful insights. Often these data sets are protected with authentication and are not friendly to machine learning algorithms.

Machine learning algorithms have difficulty gathering meaningful insights for unstructured data sets. This is especially true for transactional web sites primarily structured for human interaction. Web sites designed for human interaction without any machine data transfer capability are notoriously difficult to use for gathering big data.

SUMMARY

In one embodiment, the present disclosure provides a method and system for allocation of resources. Authenticated and unauthenticated data sources are mined to determine event vectors from a large number of cases that follow a branched processing model or map. A current event vector is compared to the mined event vectors with machine learning to predict future nodes for the current event vector. Historical resource allocations for the mined event vectors are used to determine resource allocation for the current event vector over time.

In another embodiment, the present disclosure provides a resource management system for allocation of resources for event vectors using machine learning, the resource management system a data ingest server, a vector processing server, a prediction processing server, and an allocation server. The data ingest server is configured to: download first data from a first source, authenticate access to a second source, and download second data from the second source after authenticating. The vector processing server is configured to generate a dataset comprising event vectors. The dataset is a function of the first data and the second data. Each of the event vectors comprise a number of nodes spaced in time. Each of the number of nodes is selected from a branched processing model of possible nodes. Each of the plurality of event vectors traverses the branched processing model of possible nodes in many different ways with different timing. The prediction processing server is configured to: load an event vector, machine match the event vector to a subset of the plurality event vectors, and predict future nodes for the event vector through completion as a function of the machine matching. The allocation server is configured to determine resource allocation for the event vector through completion.

In yet another embodiment, the present disclosure provides a method for allocation of resources for event vectors using machine learning. First data is downloaded from a first source. Authenticating access to a second source before downloading second data from the second source. A dataset is generated including event vectors. The dataset is a function of the first data and the second data. Each of the event vectors comprise a number of nodes spaced in time. Each of the number of nodes is selected from a branched processing model of possible nodes. Each of the event vectors traverses the branched processing model of possible nodes in a many different ways with different timing. An event vector is loaded before machine matching the event vector to a subset of the event vectors. Future nodes for the event vector are predicted through completion as a function of the machine matching. Resource allocation is determined for the event vector through completion.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
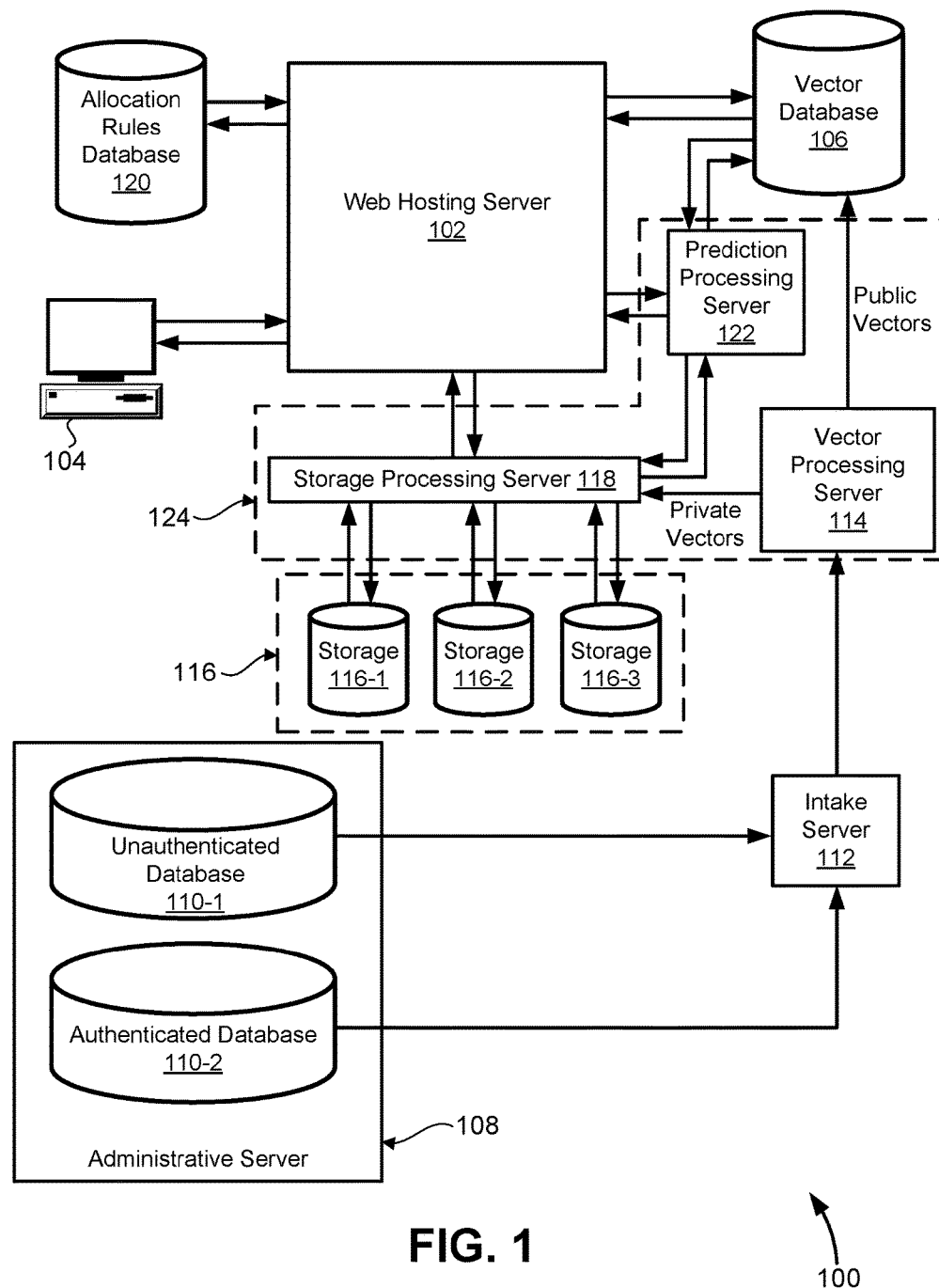
FIG. 1 illustrates a resource management system, according to an embodiment of the present disclosure.

FIG. 1 illustrates a resource management system 100, according to an embodiment of the present disclosure. The resource management system 100 includes a web hosting server 102 for hosting a web page and/or GUI through which a user device 104 or many user devices 104 (not shown) may interact. The user device 104 interacts with the web hosting server 102 via the internet or via some other type of network, e.g., local area network (LAN), wide area network (WAN), cellular network, personal area network (PAN), etc. The web hosting server 102 provides a software as a service (SaaS) delivery model in which the user device 104 accesses software via a web browser in a zero footprint configuration for the user device 104, but other embodiments could use enterprise software, handheld app or computer application software. The web hosting server 102 allows the user device 104 to download and/or install software that permits the user device 104 to use the resource management system 100. A web browser in the zero footprint configuration downloads software to work in conjunction with software on the web hosting server 102 to provide the functionality.

The resource management system 100 includes a vector database 106 coupled with the web hosting server 102 for storing vectors such as event vectors 130 (not shown). Event vectors 130 are data structures comprised of one or more nodes with defined spacing between them. Nodes correspond to recorded events, such as filings, notices, recorded interactions, etc. Event vectors 130 may be categorized as historical, predicted, hybrid, public, private, among other categorizations. Event vectors 130 are described in greater detail below in relation to FIG. 5.

The resource management system 100 includes an administrative server 108 for generating and storing administrative data. Administrative data is stored in various databases associated with the administrative server 108, including an unauthenticated database 110-1 and an authenticated database 110-2. The unauthenticated database 110-1 contains administrative data that is public while the authenticated database 110-2 contains administrative data that requires user authentication in order to access. Although the administrative server 108 is shown with both the authenticated database 110-2 and unauthenticated database 110-1, other embodiments could have those databases 110 on different servers and/or domains. For example, the unauthenticated database 110-1 could have scheduling for a courtroom with the public filings listed without full availability, but a third party service or attorney authenticated database 110-2 would have more complete access with the ability to download electronic copies.

Examples of the administrative server 108 could in various embodiment includes: domain name records, medical records, theater schedules, administrative dockets, etc. in the unauthenticated database 110-1 and the corresponding authenticated database 110-2 for each respectively: admin access to domain management, access to the full health record, theater management interface, full docket download, etc. It is very common to provide limited access to information in an unauthenticated manner and richer access in an authenticated manner for human accessible interfaces. Although this embodiment has an unauthenticated database 110-1 and an authenticated database 110-2, other embodiments may have some sort of validation for the unauthenticated database 110-1 such as a CAPTCHA or other validation of the user while others could have different levels of authentication for the databases such as limited access for unlicensed users and full access for licensed users.

The resource management system 100 includes an intake server 112 that accesses the administrative server 108 and retrieves administrative data either continuously, periodically, or when prompted by another component within the resource management system 100 to do so. For example, prior to any process being performed within the resource management system 100 using administrative data, the intake server 112 may be prompted to verify that the administrative data being used is current and that no new administrative data is available. Some embodiments scrape the administrative server 108 while the user is interacting with the web hosting server 102. Other embodiments receive periodic e-mail, text, or other messages from the administrative server indicating that updated information is available. In any event, the administrative server 108 is configured for human access to information in this embodiment so typical machine to machine transfer of information requires the intake server 112 to spoof a user account and scraping. Other embodiments could have APIs and/or protocols such that the intake server 112 is unnecessary.

The resource management system 100 includes a vector processing server 114 that receives administrative data from the intake server 112 and generates event vectors 130 based on the administrative data. Event vectors 130 that are generated based on administrative data from the unauthenticated database 110-1 are categorized as public vectors and may be sent to the vector database 106. Event vectors 130 that are generated based on administrative data from the authenticated database 110-1 are categorized as private vectors and are sent to a storage processing server 118. The vector processing server 114 is described in greater detail in reference to FIG. 2. Domains of access to the private vectors are designed to match the scope of access to a user from the authenticated database 110-2, but could expand to a larger group of users, for example, attorney access to court filings could be shared with other users of the web hosting server 102 from the same company and/or law firm. Domains within any group can be designed to accommodate corporate, government or other classification levels to limit access to administrative data and their corresponding vectors.

The resource management system 100 includes storage 116 for storing user-specific information generated by and/or uploaded to the resource management system 100. The storage 116 differ from the vector database 106 in several respects. First, the storage 116 contains user-specific information (e.g., private vectors) that a user may want to keep private outside of a defined domain. Second, access to the storage 116 requires user authentication, whereas access to the vector database 106 does not require user authentication. Third, the storage 116 do not exclusively contain event vectors 130 but may include other information such as user preferences, authenticated database login information and credentials, trade secret information, augments to the authentication data, and/or allocation rules. Contents of the storage 116 are described in greater detail in reference to FIG. 3. The storage 116 can be geofenced to a defined country or countries, stored in the cloud, stored behind a user's firewall, or/and stored on the user device 104.

The resource management system 100 includes a storage processing server 118 for maintaining the storage 116, maintaining domains and otherwise controlling access. The storage processing server 118 serves two purposes. First, the storage processing server 118 identifies and selects the proper storage that a storage requestor is requesting access to, e.g., a first storage 116-1, a second storage 116-2, or third storage 116-3. Second, the storage processing server 118 verifies that the storage requestor has the proper authentication to access the specific storage being requested. The storage processing server 118 is described in greater detail in reference to FIG. 3. Although this embodiment shows the storage 116 being divided in three, other embodiments could have any number of divisions. These divisions could be physical or logical in various embodiments, for example, a user may wish that the information in their domain be stored on storage of their choice.

The resource management system 100 includes an allocation rules database 120 for storing allocation rules 138 (not shown in FIG. 1). As used herein, allocation rules 138 refers to resource rules for mapping cost amounts to different nodes within event vectors 130 and predicted event vectors 132. Allocation rules 138 may be user- or domain-specific or may be global estimates based on industry practice or analysis of similar nodes. For example, allocation rules 138 may be derived from third-party survey information, user specified or historical costs and their timing loaded into the resource management system 100 to allow machine learning to determine the allocation rules automatically. In some embodiments, the allocation rules database 120 includes an invoice intake server which retrieves bills and invoices from users or databases and analyzes the information to generate user-specific allocation rules 138 automatically. Costs and/or allocation rules 138 can correspond to one or more statistics. For example, a cost amount may correspond to an average or median cost incurred for a given node and can be represented with a curve to reflect the resources used over time. The resource amount may depend on variation (or standard deviation). For example, it may be selected using a Monte Carlo technique based on a statistical distribution of resource consumption for a given type of node. The resource amount may also include a defined (and/or non-variable and/or fixed) portion, such as a known government fee or tax. Variation in the resource amount is correlated to the service provider, decision maker, similarity to other cases, etc. as determined by empirical analysis or machine learning.

The resource management system 100 includes a prediction processing server 122 for generating predicted event vectors 132 (not shown) and predicted allocation vectors 136 (not shown). The prediction processing server 122 retrieves data from the vector database 106, the storage 116, the web hosting server 102, and the allocation rules database 120. The prediction processing server 122 is described in greater detail in reference to FIG. 4 below.

In some embodiments, the vector processing server 114, the storage processing server 118, and the prediction processing server 122 may collectively be referred to as the processing server 124 (which may include a plurality of servers). Each of the servers within the processing server 124 may be owned and operated by a same or different entity managing the resource management system 100. In some embodiments, the processing server 124 further includes the storage 116, the vector database 106, and the allocation rules database 120. In some embodiments, the processing server 124 further includes the intake server 112. These various servers may be collocated or spread across the Internet or a WAN. Functions assigned to one server, database or block may be combined with others or separated in different embodiments.

The resource management system 100 includes a quality tool for assessing the quality of services or actions taken for each of the vectors and the resulting work product produced. The quality tool is implemented within the web hosting server 102, the prediction processing server 122, or within some other component within the resource management system 100. The quality tool generates technology-specific probabilistic distributions (e.g., normal, skewed) that correspond to the work product for a vector. A score for each item analyzed is determined in comparison to the probabilistic distributions. The different scores for various nodes of the vector are calculated are combined to generate a single score. In some embodiments, the score is based on a z-score, which may be negative or positive. In some embodiments, the quality tool determines whether certain portions of the work product are duplicated in other nodes, and such portions are removed prior to determining a quality score.

Figure 2:
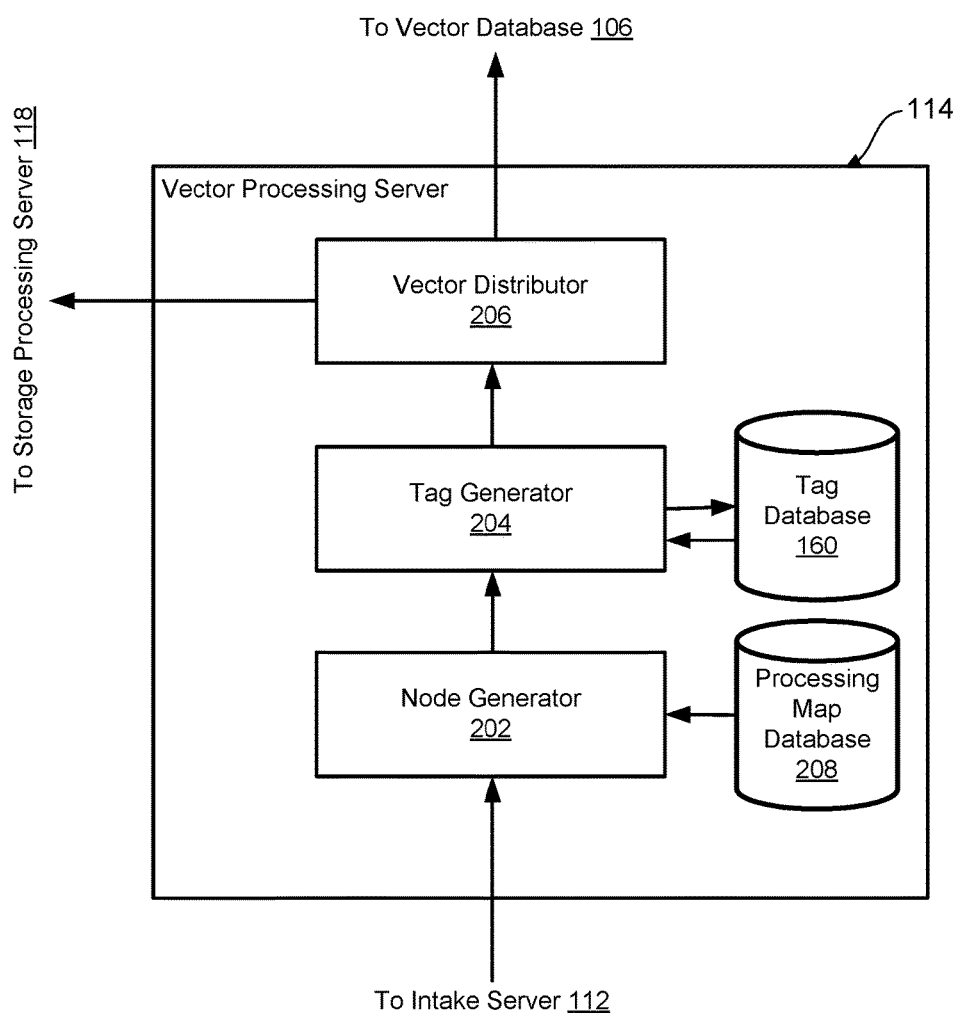
FIG. 2 illustrates a vector processing server, according to an embodiment of the present disclosure.

FIG. 2 illustrates the vector processing server 114, according to an embodiment of the present disclosure. The vector processing server 114 receives administrative data from the intake server 112 and generates event vectors 130 based on the administrative data. The vector processing server 114 includes a node generator 202 that analyzes the administrative data and correlates it to one or more nodes based on a processing map where each node corresponds to a state in a state machine, branch in a decision tree or block in a flow diagram that defines the patterns of activity for the processing map of the administrative data. The processing map database 208 holds different processing maps for different situations, for example, there could be a processing map for a traffic ticket and another for a misdemeanor theft. The node generator 202 additionally spaces the nodes according to the administrative data according to the timing between different data nodes. By way of example, consider that the administrative data indicates that a traffic violation occurred on Jan. 1, 2016, received an arraignment on Jan. 1, 2017, and a court hearing on Jul. 1, 2017. The node generator 202 creates three nodes, the first node comprising a type "T" (for ticket), the second node comprising a type "A" (for arraignment), and the third node comprising a type "C" (for court). The spacing between the first node and the second node may be set to 1 (corresponding to 1 calendar year) and the spacing between the second node and the third node may be set to 0.5 (corresponding to ½ a calendar year). In this example, the output of the node generator 202 is an event vector 130. In some embodiments, the spacings between nodes of an event vector 130 are identified in an associated spacing vector having a length one less than the number of nodes in the event vector 130. For example, continuing with the previous example, the associated spacing vector may be 1 and 0.5.

In some embodiments, the vector processing server 114 includes a tag generator 204 that applies one or more tags to each event vector 130. Tags are stored in a tag database 160. A tag may indicate a characteristic or property of an event vector 130, and may be derived from the administrative data, entered by a user, or from some other source. Examples of tags include but are not limited to: type of technology, type of administrative task, client tags, file numbers, event, and the like for different types of administrative data. The tag generator 204 automatically generates from administrative data and/or from user input the tag(s) for the event vector 130 by finding similar vectors or underlying administrative data. Tags may be applied to event vectors 130 by the tag generator 204 or may be applied later by a user. For example, the tag generator 204 may apply the tags "wireless technology", "Model No. S45X", and "traffic infraction" to a particular event vector 130. A user may later apply the tag "phone antenna" to the same event vector 130. In some embodiments, a user may modify, delete, or add an existing tag.

In some embodiments, the vector processing server 114 includes a vector distributor 206 for sending event vectors 130 either to the storage processing server 118 and/or to the vector database 106. In some embodiments, a determination may be made as to whether an event vector 130 is public or private. This determination may be based on whether a corresponding administrative data is public or private. Public event vectors 130 may be sent to the vector database 106 and private event vectors 130 may be sent to the storage processing server 118. In some embodiments, the vector distributor 206 makes the determination as to whether an event vector 130 is public or private by searching for the corresponding administrative data within the unauthenticated database 110-1 and/or the authenticated database 110-2 (e.g., to identify the vector as public if a corresponding patent application is identified as a result of a query to the unauthenticated database 110-1 but not otherwise). In some embodiments, the vector distributor 206 makes the determination by analyzing a timestamp or date associated with the corresponding administrative data. In one embodiment, the administrative data expressly indicates whether the action or proceeding corresponding to the even vector 130 is public, private or partially one or the other. Tags for a vector may be forwarded along with the vectors for storage in their respective databases.

Figure 3:
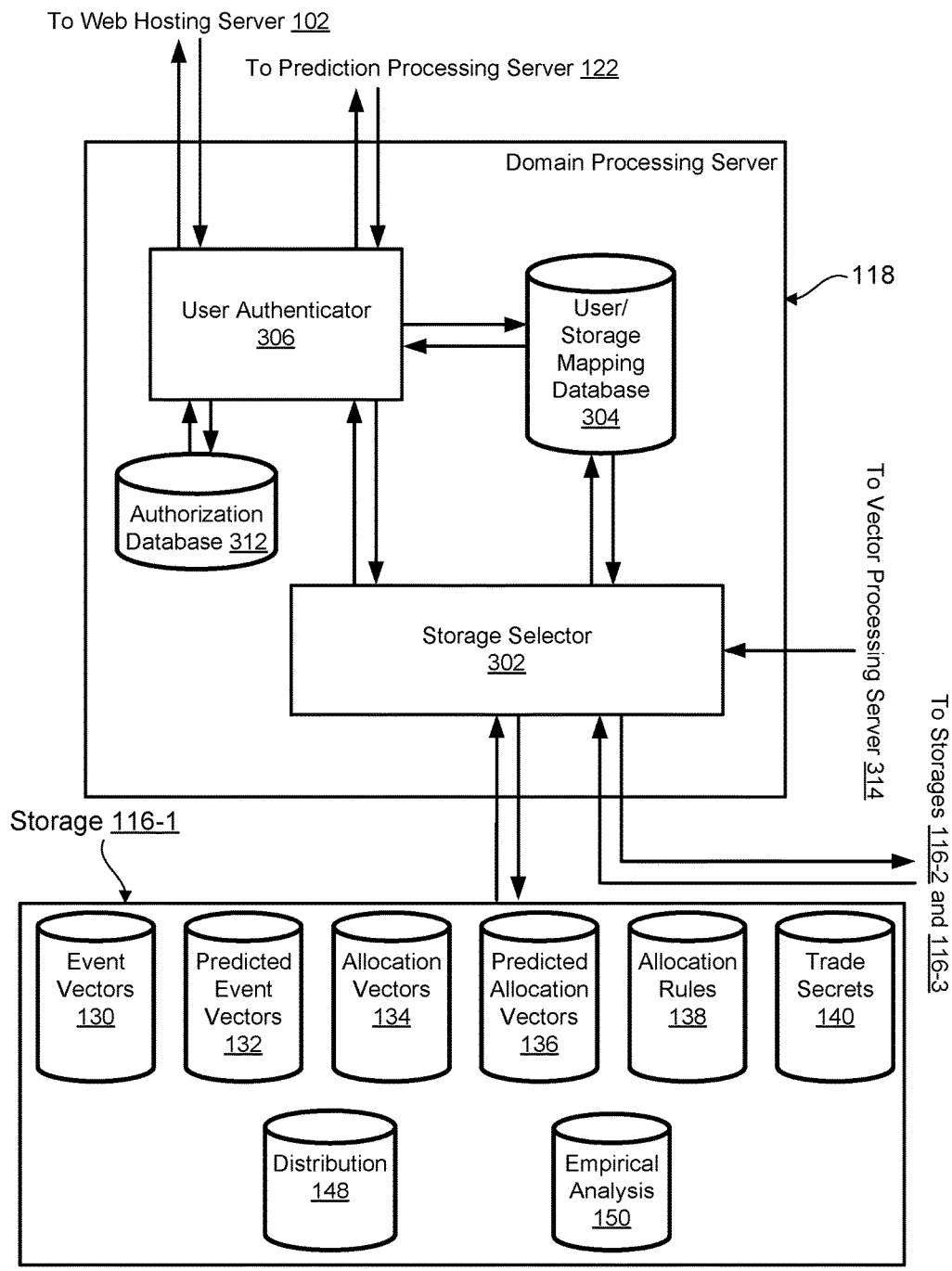
FIG. 3 illustrates a storage processing server and a storage, according to an embodiment of the present disclosure.

FIG. 3 illustrates the storage processing server 118 and storage 116-1, according to an embodiment of the present disclosure. The storage processing server 118 includes a storage selector 302 for identifying, selecting, and routing information to and/or from the proper storage that a storage requestor is requesting access to, e.g., storage 116-1, 116-2, or 116-3. To determine the proper storage to route information through, the storage selector 302 accesses a user/storage mapping database 304 which includes a mapping between users, domains and storages. For example, the user/storage mapping database 304 may indicate that a first user has access to storage 116-1, a second user has access to storages 116-2 and 116-3, and a third user has access to storage 116-3. By way of another example, a private event vector 130 may be sent by the vector processing server 114 to the storage processing server 118 and the storage selector 302. The storage selector 302 may analyze the administrative data associated with the private event vector 130 to determine that the private event vector 130 corresponds to the first user. The storage selector 302 may then access the user/storage mapping database 304 to determine which storage the first user may access. After determining that the first user has access to storage 116-1, the storage selector 302 may route and store the private event vector 130 in storage 116-1.

The storage processing server 118 includes a user authenticator 306 for verifying that a storage requestor has the proper authentication to access the specific storage being requested. The user authenticator 306 first determines which user is requesting access. Second, the user authenticator 306 accesses the user/storage mapping database 302 to determine whether the user has access to any of the storage 116. Third, the requester is routed to the storage selector 302 for identifying and selecting the proper storage for the user and/or their domain. In some embodiments, a storage requestor requests to access a specific storage, e.g., storage 116-1. In other embodiments, a storage requestor requests to access a non-specific storage, i.e., any available storage of the storage 116. For example, when a storage requestor requests to only store information in any available storage of the storage 116, the storage selector 302 may identify, select, and route information to any available storage to which the user is authorized to access.

The storage 116 include various user-specific information including, but not limited to: event vectors 130, predicted event vectors 132, allocation vectors 134, predicted allocation vectors 136, allocation rules 138, and trade secrets 140. The storage 116 include information, such as event vectors 130, that is not user-specific. For example, in some embodiments, a copy of the vector database 106 may be included in the storage 116. In some embodiments, the storage 116 export private event vectors 130 to the vector database 106 when they become public, based on updated administrative data from the administrative server 108, or based on a certain passage of time from when the private event vectors 130 were first stored within the storage 116 or were first generated by the vector processing server 114. In some cases, the private event vectors 130 are unclassified by the owning entity.

Figure 4:
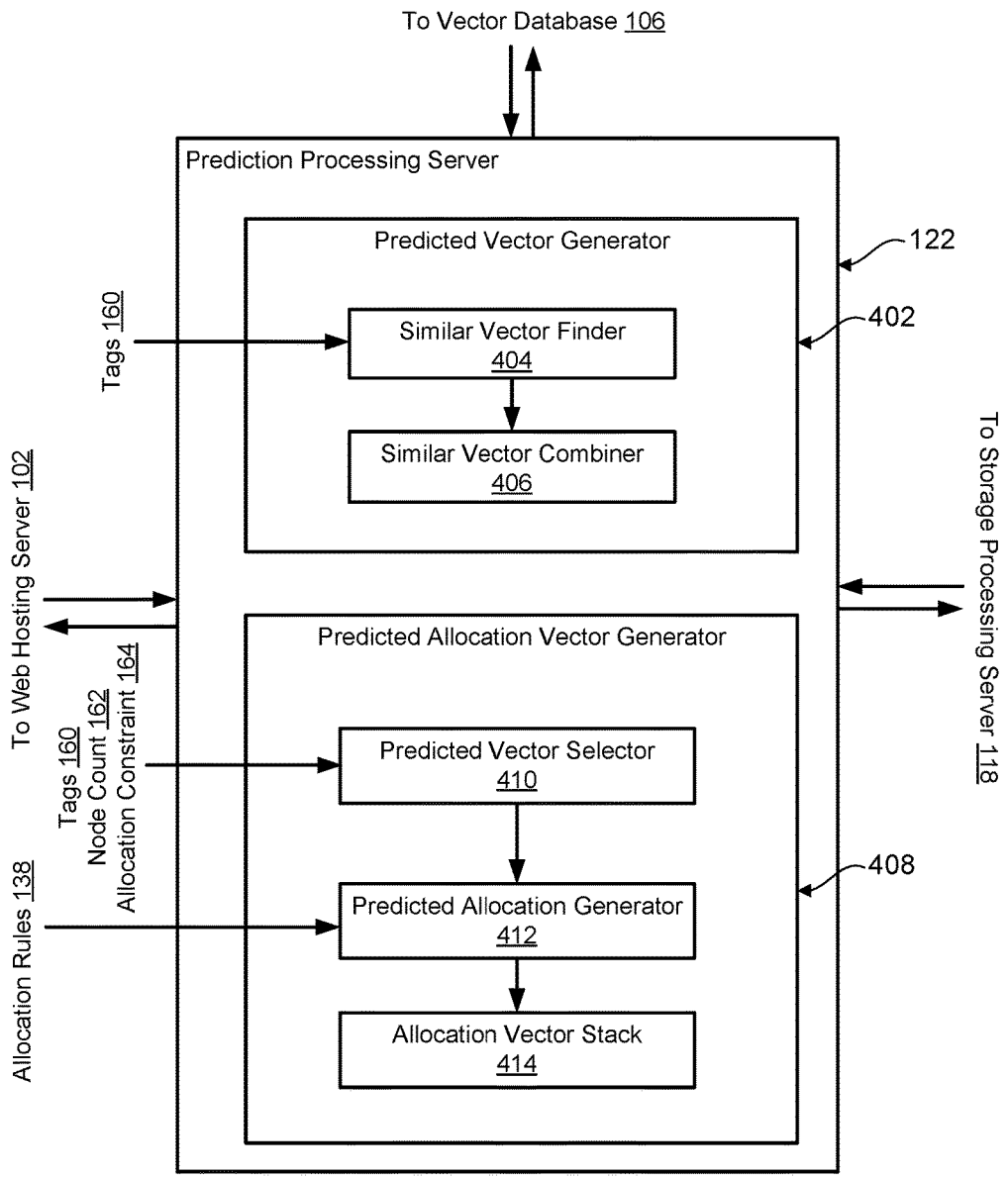
FIG. 4 illustrates a prediction processing server, according to an embodiment of the present disclosure.

FIG. 4 illustrates a prediction processing server 122, according to an embodiment of the present disclosure. The prediction processing server 122 includes a predicted vector generator 402 for generating predicted event vectors 132. The predicted vector generator 402 includes a similar vector finder 404 and a similar vector combiner 406, among other components. The similar vector finder 404 identifies a subset of similar event vectors 130 based on one or more input tags 160 or administrative data. The subset of similar event vectors 130 includes one or more event vectors 130, each of which are similar to each other via the input tags 160 or administrative data. The similar vector finder uses machine learning to determine which vectors are similar. For example, if an input tag 160 were "wireless technology" and/or the administrative data identified "Nancy Smith" as the decision maker the similar vector finder 404 may search the vector database 106 and the storage 116 to identify a subset of event vectors 130 having the same tag 160 or administrative data or a something that is similar.

In some embodiments, the similar vector finder 404 correlates the documents filed or proposed for filing of the event vectors 130 within the vector database 106 and the storage 116 to identify the subset of similar event vectors 130. For example, a first user and their event vector 130 may have very similar records with a second user such that the scans and optical character recognition (OCR) for the first would dictate a map and path through that map likely for the second user for their event vector 130. With more administrative data of similar event vectors 130, the machine learning algorithms will improve the predictions. For example, if the court records for 100,000 traffic infractions are processed, the similar vector finder 404 is likely to quickly find similar event vectors 130 for a new traffic violation. Prediction of the map, nodes, resources allocated, the outcome, and timing of each node becomes more accurate with a larger set of administrative data.

In some embodiments, the similar vector finder 404 searches through all event vectors 130 in the vector database 106 but only the event vectors 130 within the storage 116 that the user is authorized to access. For example, a first user that is only authorized to access storage 116-1 may cause the similar vector finder 404 to search through all event vectors 130 in the vector database 106 but only the event vectors 130 in storage 116-1 within the user's domain. In some embodiments, the similar vector finder 404 is allowed to search through other storages of the storage 116 that a user is not authorized to access only when event vectors 130 retrieved from those storages would be unrecognizable or de-identified such that the machine learning algorithm has a richer data set, but no confidential, trade secret or classified information is shared. A group of event vectors 130 are unrecognizable when they comprise less than some threshold, such as 1%, 5%, or 10% of the total event vectors 130 included in the subset of similar event vectors 130. In this manner, it would be difficult for a user of the resource management system 100 to trace an event vector 130 from the subset of similar event vectors 130 to another user. One benefit of allowing users to utilize event vectors 130 from storages that they are not authorized to fully access is that it increases the accuracy of the predicted event vectors 132 and the predicted allocation vectors 136, particularly in situations in which there may be few available event vectors 130 with tags 160 that are similar to the input tags 160 and administrative data.

The similar vector finder 404 outputs the identified subset of similar event vectors 130 to the similar vector combiner 406 which combines the subset of similar event vectors 130 to generate a predicted event vector 132. In some embodiments, the predicted event vector 132 is generated based on an average of all the event vectors 130 within the subset of similar event vectors 130. In other embodiments, more complex approaches are employed to generate the predicted event vector 132. For example, in some embodiments the event vectors 130 included in the subset of similar event vectors 130 are analyzed to determine a centroid value of nodes, which may be equal to the average or median number of nodes. The centroid value of nodes is rounded and then all event vectors 130 within the subset of similar event vectors 130 having a number of nodes equal to the centroid value of nodes are averaged. In some embodiments, the predicted vector generator 402 performs method 3200 described in reference to FIG. 32.

The prediction processing server 122 includes a predicted allocation vector generator 408. The predicted allocation vector generator 408 includes a predicted vector selector 410 which selects one or more predicted event vectors 132 generated by the predicted vector generator 402 based on various inputs including tags 160, node counts 162, administrative data, and allocation constraints 164. The predicted allocation vector generator 408 includes a predicted allocation generator 412 which generates predicted allocation vectors 136 by applying one or more allocation rules 138 to the predicted event vectors 132 received from the predicted vector selector 410. The resources consumed by each predicted event vector 132 is determined, where resources could include processing cycles, monetary cost, time/delay consumed, personnel resources, office/warehouse space consumed, etc.

The predicted allocation vector generator 408 includes an allocation vector stack 414 for generating a combined allocation vector by stacking one or more predicted allocation vectors 136. The predicted allocation vectors 136 are stacked according to an allocation constraint 164. For example, if there is no allocation constraint 164 (i.e., allocation constraint=∞), the predicted allocation vectors 136 are stacked such that "F" nodes are aligned. By way of another example, if the allocation constraint 164 limits the combined allocation vector to a value of 30,000 per unit of time, then the predicted allocation vectors 136 are stacked such that no single unit of time has a value greater than 30,000.

Resource estimations could be based upon the resources consumed for the similar event vectors 130. Sometimes flat fees for each node are known or invoices for the similar event vectors such that cost resources and timing can be estimated. Those similar event vectors could be averaged to provide a distribution of resources over time. The average or median could be used for an estimate of the resources needed. When estimating resources part of the way through a map, some nodes are historical and some nodes are predicted. Where historical resource data is available for nodes in the past, that can be used with the similar event vectors 130 completing the map in a predictive manner.

Figure 5:
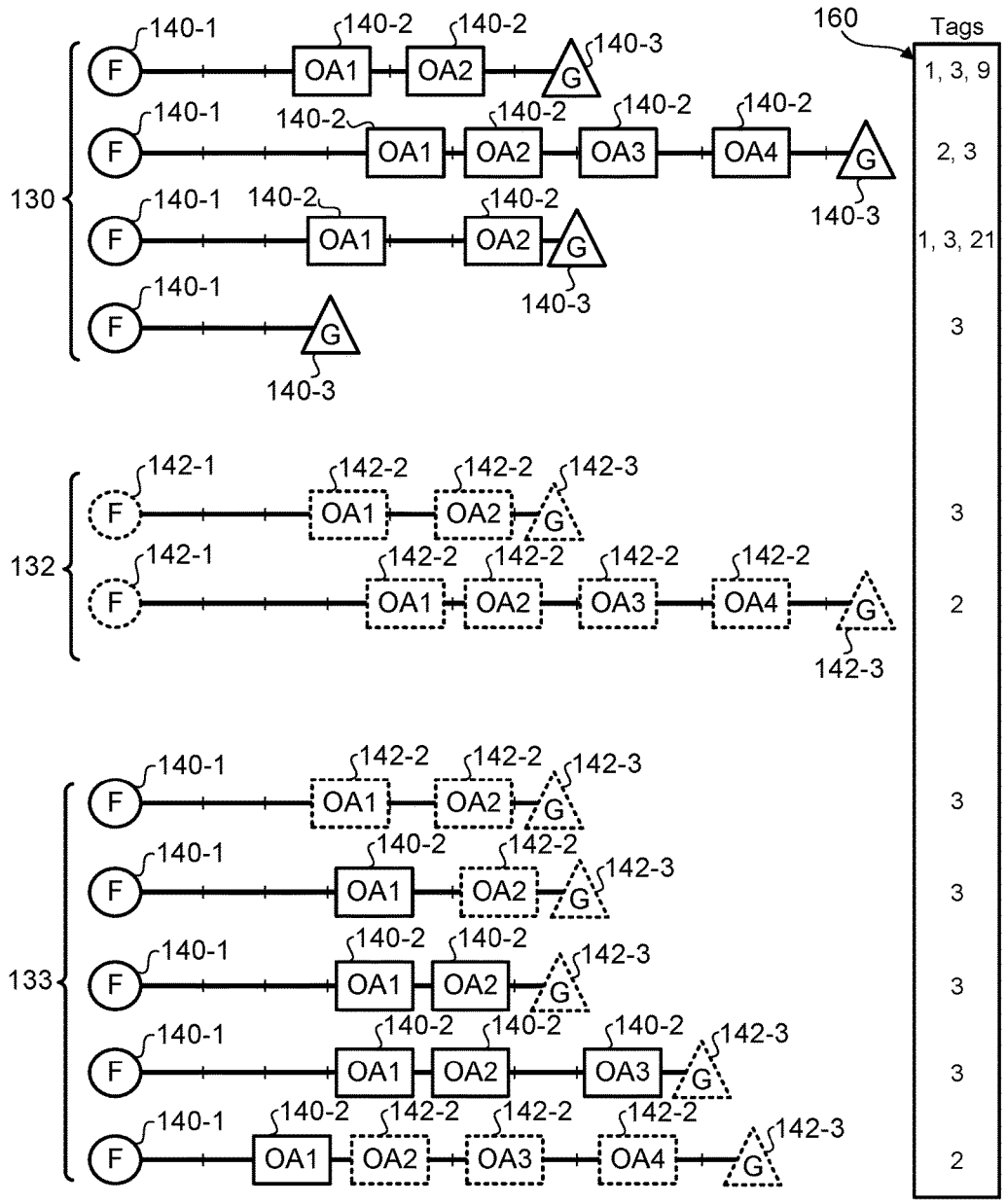
FIG. 5 illustrates various types of vectors, according to an embodiment of the present disclosure.

FIG. 5 illustrates various types of vectors and their corresponding tags 160, according to an embodiment of the present disclosure. Past event vectors 130, predicted event vectors 132, and hybrid event vectors 133 are data structures comprised of one or more nodes with defined spacing between them. Nodes 140, 142 within an event vector 130 are organized by a chronology in time such that nodes at the beginning of an event vector 130 correspond to events that occur earlier in time than nodes at the end of an event vector 130. Event vectors 130 are comprised of past nodes 140 corresponding to events that have already taken place (referred to as nodes 140). For example, an event vector 130 may correspond to a ticket "F" 140-1 that was previously issued, previous two court hearings "OA1" and "OA2" 140-2, and previous decision "G" 140-3. Predicted event vectors 132 are comprised of nodes 142 corresponding to events/filings/etc. that have yet to take place (referred to as predicted nodes 142). For example, a predicted event vector 132 may correspond to a court hearing "OA1" 142-2 that is predicted to happen in a week from the present day. Hybrid event vectors 133 are comprised of at least one past node 140 that corresponds to events that have already taken place and at least one predicted node 142 that corresponds to events that haven't taken place.

Figure 6:
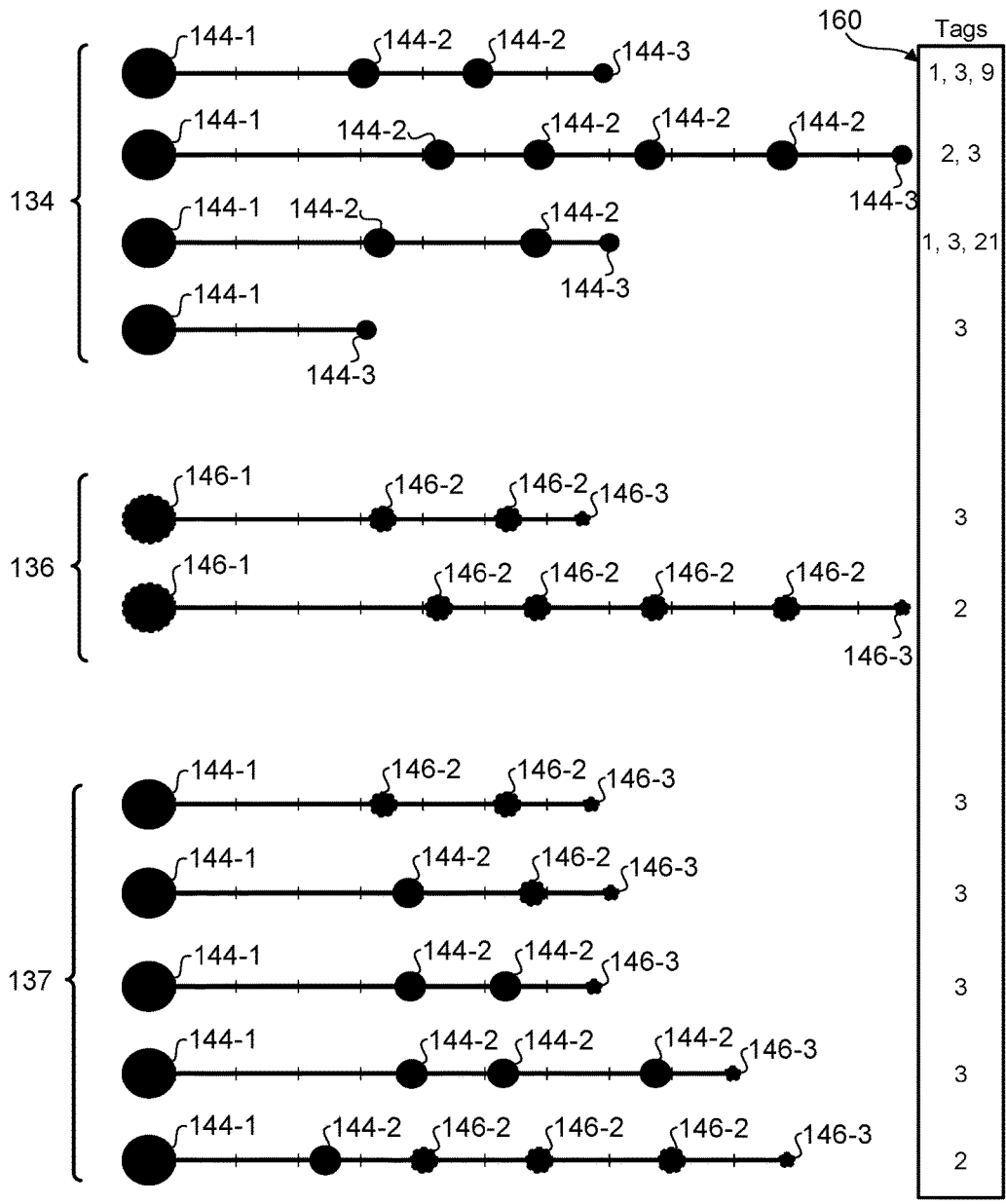
FIG. 6 illustrates various types of vectors, according to an embodiment of the present disclosure.

FIG. 6 illustrates various types of vectors, including past allocation vectors 134 (comprised of past allocation nodes 144), predicted allocation vectors 136 (comprised of predicted allocation nodes 146), and hybrid allocation vectors 137 (comprised of both past allocation nodes 144 and predicted allocation nodes 146), according to an embodiment of the present disclosure. Past allocation vectors 134, predicted allocation vectors 136, and hybrid allocation vectors 137 are generated by applying one or more allocation rules 138 to past event vectors 130, predicted event vectors 132, and hybrid event vectors 133, respectively. For example, the allocation vectors 134, 136, 137 shown in FIG. 6 are generated by applying the following allocation rules 138 to the vectors shown in FIG. 5: an "F" node corresponds to a cost of 10,000, an "OA" node corresponds to a cost of 5,000, and a "G" node corresponds to a cost of 2,000. Thus, allocation nodes 144, 146 within past allocation vectors 134, predicted allocation vectors 136, and hybrid allocation vectors 137 include numerical data indicative of the resources allocated in addition to other information associated with allocation nodes 144, 146. The vectors shown in FIG. 6 retain the same spacing between nodes as the vectors shown in FIG. 5 from which they correspond where spacing is representative of time in this embodiment.

Figure 7:
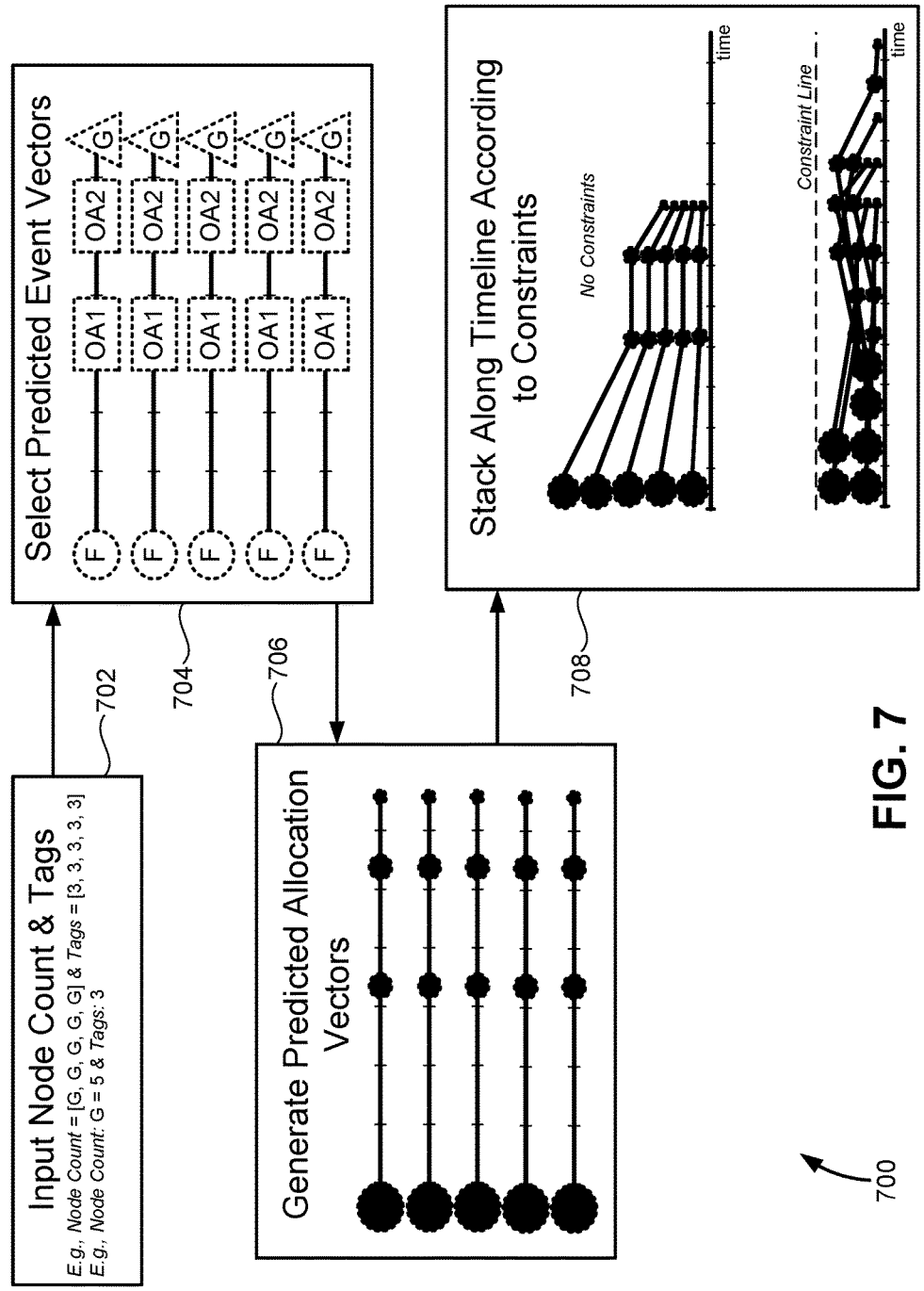
FIG. 7 illustrates a method for generating a combined allocation vector, according to an embodiment of the present disclosure.

FIG. 7 illustrates an allocation method 700 for generating a combined allocation vector, according to an embodiment of the present disclosure. At step 702, a node count 162 and one or more tags 160 are received as input. For example, a node count 162 of G=5 and input tags 160 equal to "3" may be received as input (corresponding to five vectors each having a "G" node and a "3" tag). At step 704, one or more predicted event vectors 132 satisfying the specified node count 162 and tags 160 are selected. For example, five predicted event vectors 132 may be selected from among a larger group of predicted event vectors 132 that were previously generated, each of the five having a "G" node and having been generated using an input tag 160 equal to "3" (see FIG. 4). Although the selected predicted event vectors 132 are depicted in FIG. 7 as being identical, this may not always be the case, particularly when the node count 162 is more complex (e.g., F=10, OA=7, and G=5).

At step 706, predicted and hybrid allocation vectors 136, 137 are generated by applying allocation rules 138 to the predicted and hybrid event vectors 132, 133. At step 708, a combined allocation vector is generated by stacking the predicted allocation vectors 136. In some embodiments, the predicted allocation vectors 136 are stacked along a timeline. In some embodiments, the predicted allocation vectors 136 are stacked under no constraints such that "F" nodes are aligned at the beginning of the timeline. In other embodiments, the predicted allocation vectors 136 are stacked under an allocation constraint 164 specifying a maximum combined value per unit of time. For example, the allocation constraint 164 may specify a maximum value of 20,000 per unit of time.

Predicted and hybrid allocation vectors 136, 137 have a "stretching" property when they undergo a stacking operation. The "stretching" property allows the spacing between certain nodes to be extended by a specified amount. For example, the spacing between an "F" node and a "OA1" node may be extended by 0.25 (corresponding ¼ of a calendar year), and the spacing between an "OA1" node and a "OA2" node may also be extended by 0.25. Other rules under the "stretching" property are possible. Utilizing the "stretching" property improves the efficiency of the stacking operation and may decrease the overall length of the combined allocation vector.

Figure 8:
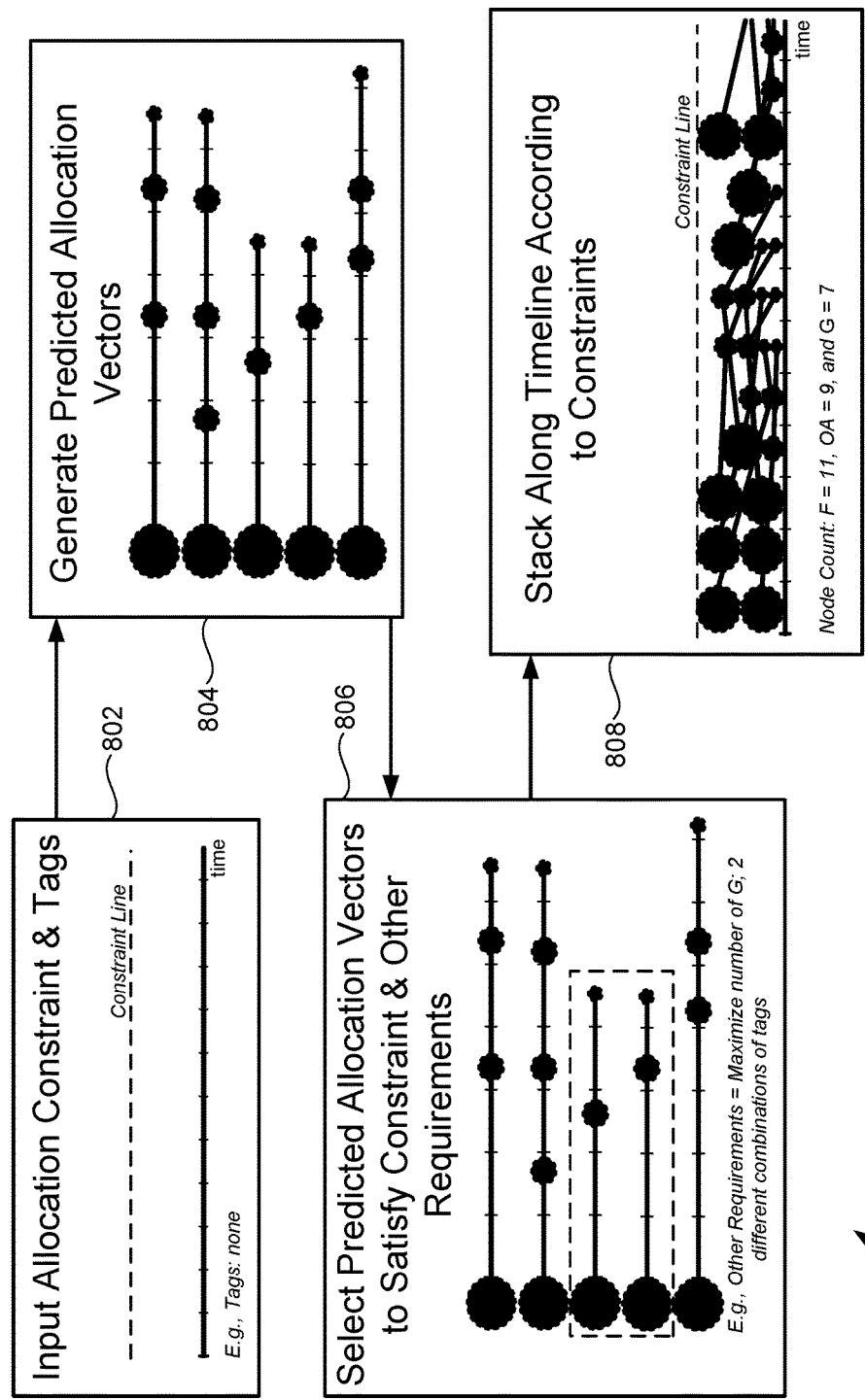
FIG. 8 illustrates a method for generating a combined allocation vector, according to an embodiment of the present disclosure.

FIG. 8 illustrates a method 800 for generating a combined allocation vector, according to an embodiment of the present disclosure. At step 802, an allocation constraint 164 of resources, and one or more tags 160 are received as input. At step 804, one or more predicted allocations vectors are generated by applying allocation rules 138 to one or more predicted event vectors 132. Predicted allocation vectors 136 are generated for each past event vector 130 contained within the vector database 106 and the storage 116. At step 806, predicted allocation vectors 136 are selected to satisfy the allocation constraint 164 as well as other requirements or criteria. For example, one criteria may be to select predicted allocation vectors 136 to maximize the number of "G" nodes. Another criteria may be to select at least two different types of predicted allocation vectors 136. At step 808, a combined allocation vector is generated by stacking the predicted allocation vectors 136 such that the allocation constraint 164 is never exceeded and the length of the combined allocation vector is minimized. In some embodiments, a node count 162 is outputted (e.g., F=11, OA=9, and G=7).

Figure 9:
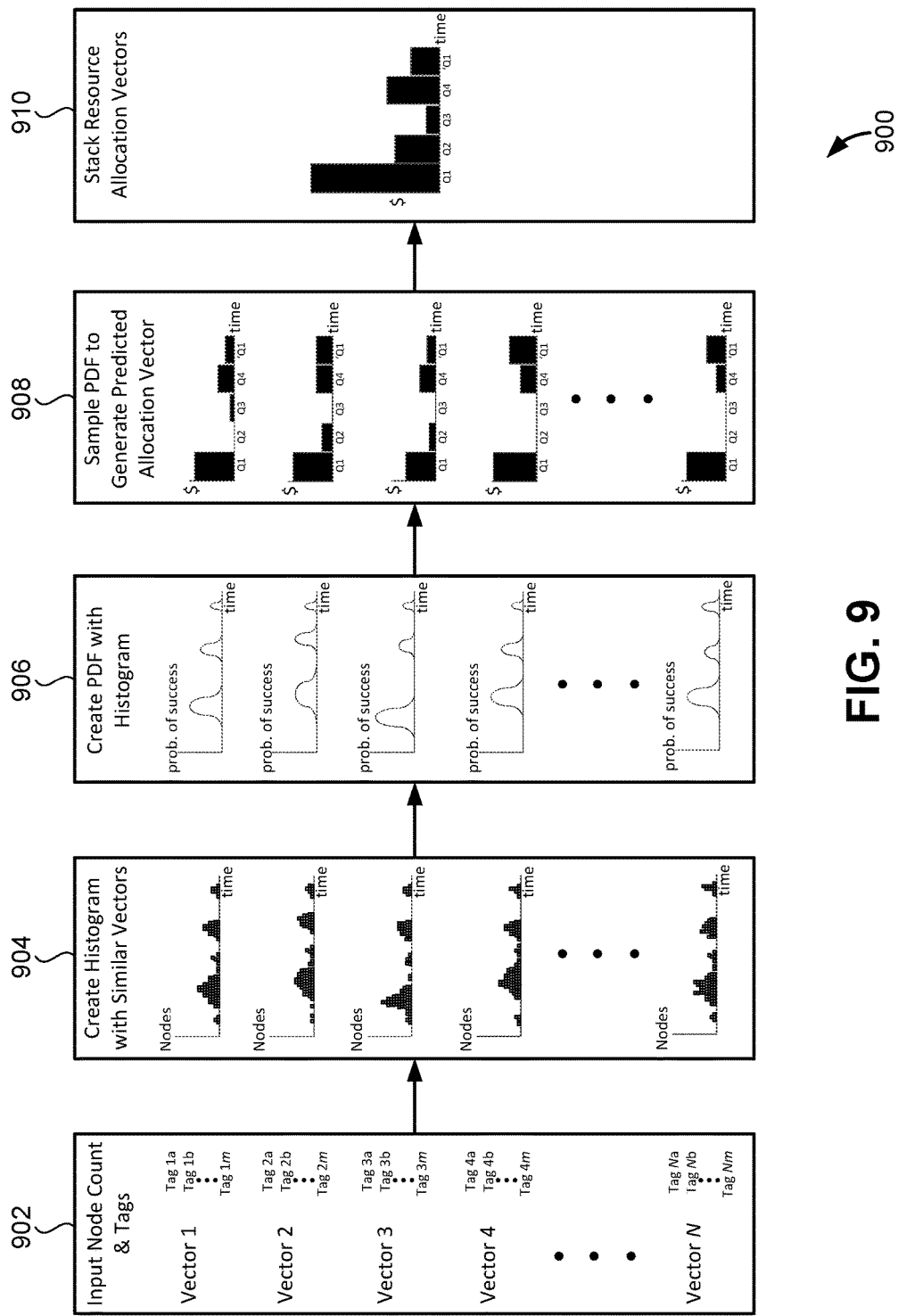
FIG. 9 illustrates a single realization approach for generating a combined allocation vector, according to an embodiment of the present disclosure.

FIG. 9 illustrates a single realization approach 900 for generating a combined allocation vector, according to an embodiment of the present disclosure. At step 902, a node count 162 (e.g., N) and one or more tags 160 are received as input. At step 904, N histograms are created using the nodes of all the similar event vectors 130 that are identified using the similar vector finder 404. At step 906, N probability density functions (PDFs) are created using the N histograms. The PDFs represent the probability of success as a function of time. For example, the PDFs may be created by filtering out all nodes except the "G" nodes of the similar event vectors 130 that are identified. At step 908, the N PDFs are randomly sampled a single time to generate N predicted allocation vectors 136. For example, a PDF may be randomly sampled to obtain a single time value that represents a single realization of the PDF. The sampled time value can be converted into a predicted or hybrid event vector 132, 133 and subsequently into a predicted or hybrid allocation vector 136, 137. For example, if the sampled time value is equal to 1.5 (corresponding to 1.5 years), then a predicted event vector 132 can be generated having an "F" node at 0 and a "G" node at 1.5 (among other possible nodes). Similarly, if the sampled time value is equal to 5.3 (corresponding to 5.3 years), then a predicted event vector 132 can be generated having an "F" node at 0 and a "G" node at 5.3 (among other possible nodes). At step 910, a combined allocation vector is generated by stacking the N predicted and/or hybrid allocation vectors 136, 137 to represent the use of resources over time.

Figure 10:
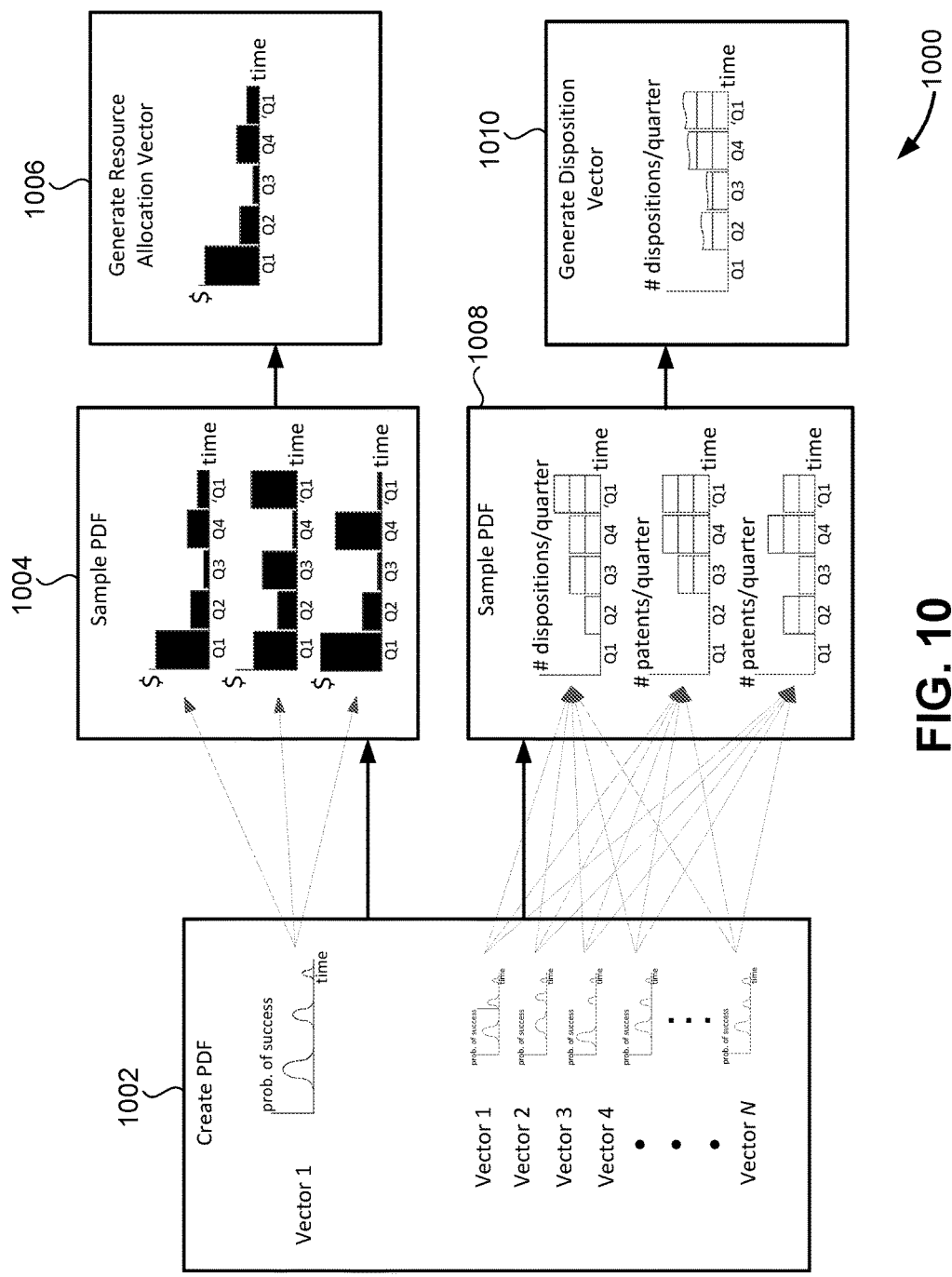
FIG. 10 illustrates a multiple realization approach for generating a combined allocation vector and a grant vector, according to an embodiment of the present disclosure.

FIG. 10 illustrates a multiple realization approach 1000 for generating a combined allocation vector and a disposition vector, according to an embodiment of the present disclosure. At step 1002, N PDFs are created using N histograms of nodes of similar event vectors 130, similar to the technique described in reference to FIG. 9. At step 1004, each of the N PDFs are randomly sampled M times to create M×N predicted allocation vectors 136. For example, the PDF corresponding to Vector 1 may be randomly sampled three times (M=3). Each of the sampled time values are converted into predicted allocation vectors 136, similar to the technique described in reference to FIG. 9. At step 1006, the M×N predicted allocation vectors 136 are averaged to generate N predicted allocation vectors 136. The N predicted allocation vectors 136 are used to generate a combined allocation vector as described elsewhere herein.

Alternatively or in addition to steps 1004 and 1006, steps 1008 and 1010 may be performed to generate a disposition vector representing an expected value of the number of different maps represented per unit of time. At step 1008, the N PDFs created in step 1002 are collectively sampled M times to create M disposition vectors. At step 1010, the M disposition vectors are averaged to create an average disposition vector. For example, the N PDFs created in step 1002 may be collectively sampled M times to create M disposition vectors, where each disposition vector only includes non-negative integer values representing the number of maps disposed of during a quarter. The M disposition vectors are then averaged to create one average disposition vector, which includes non-negative values but not necessarily non-negative integers. Since disposition only occurs once for a map of activity, the average disposition vector will predict the number of dispositions per quarter.

Figure 11:
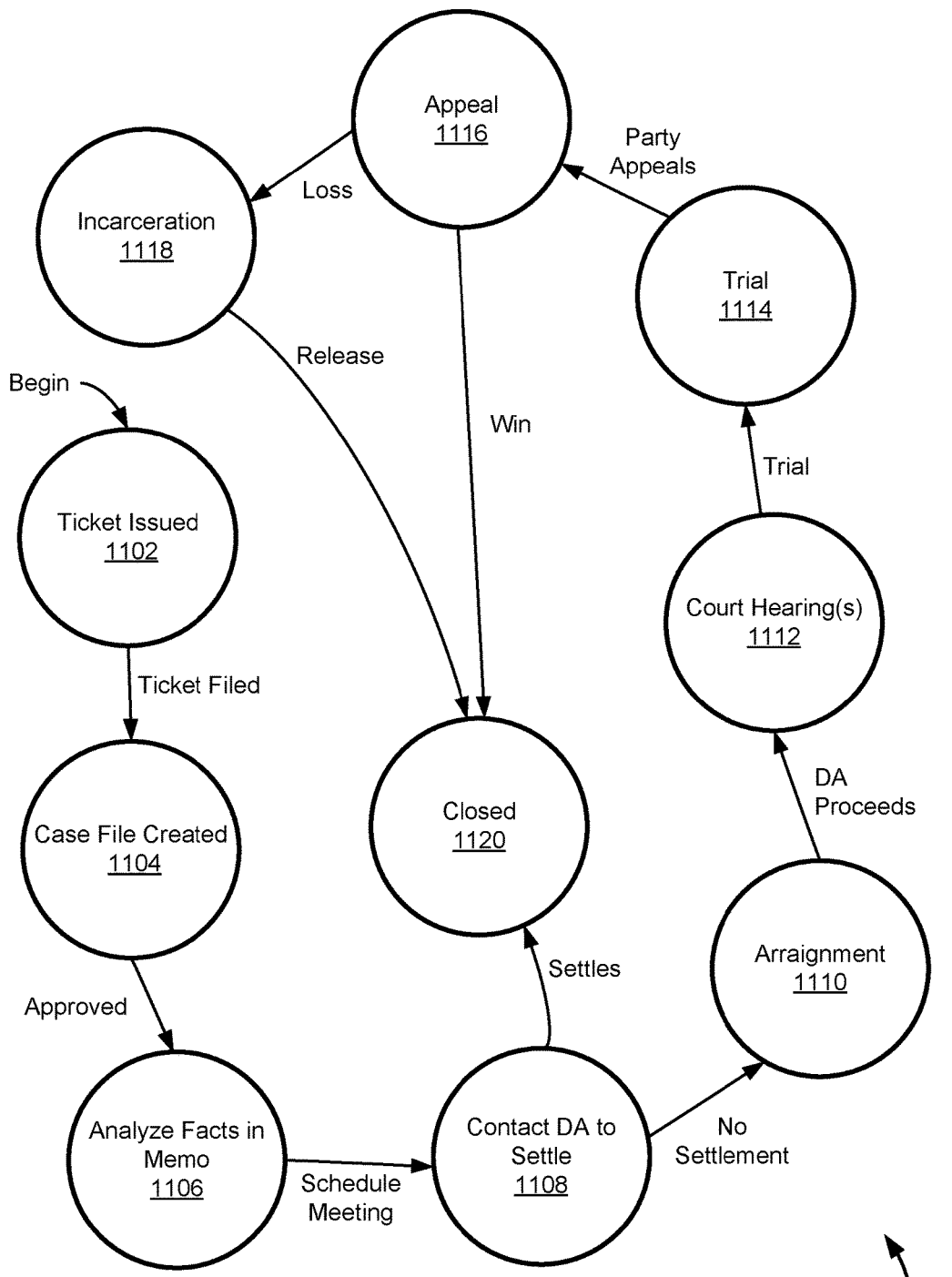
FIG. 11 illustrates a state diagram for a branched processing model that maps administrative data into nodes, according to an embodiment of the present disclosure.

FIG. 11 illustrates a state diagram 1100 for a branched processing model that maps administrative data into nodes 140, 142, according to an embodiment of the present disclosure. The state diagram 1100 shows various states or nodes of the court process progressing after receiving a ticket in this example, but other embodiments could be processing maps for a medical condition, patent application, theater production, etc. Information from the administrative server 108 is used to determine the processing map 208 to use. The processing map 208 can have far greater complexity with loops, branches, etc. Table I below depicts information that might be available publically from the unauthenticated database 110-1. The intake server 112 scrapes this information such that the vector processing server can produce a past event vector 130 for the nodes in the processing map 208 completed. In this example, the arraignment is scheduled but has not happened so it is presumed that states 1102, 1104, 1106 have happened such that those nodes 140 are added to the past event vector 130.

TABLE I

| Docket | |
|---|---|
| Date | Entry |
| Jan. 15, 2018 | Ticket entered into system |
| Feb. 23, 2018 | Discussion with counsel |
| Mar. 2, 2018 | Arraignment date set |
| Apr. 16, 2018 | Motion Filed |

Some courts and third party systems allow greater access to information from a given processing map 208 by access to an authenticate database 110-2. Often, the user must be licensed and associated with the case to get that access. In the present example, the lawyer for the defendant can upload documents and motions in addition to downloading information. The intake server 112 spoofs that authorization to scrape information useful to analyze the current processing map 208. This could be determining the infraction involved, judge assigned, states attorney, etc. and could include OCR of multiple PDF or other format documents. The learning algorithm can use the administrative data to determine predicted nodes and the timing of them by comparison to many other similar cases following the same administrative map 208. In this way, a hybrid event vector 133 and hybrid allocation vector can be determined for the present case.

Figure 12:
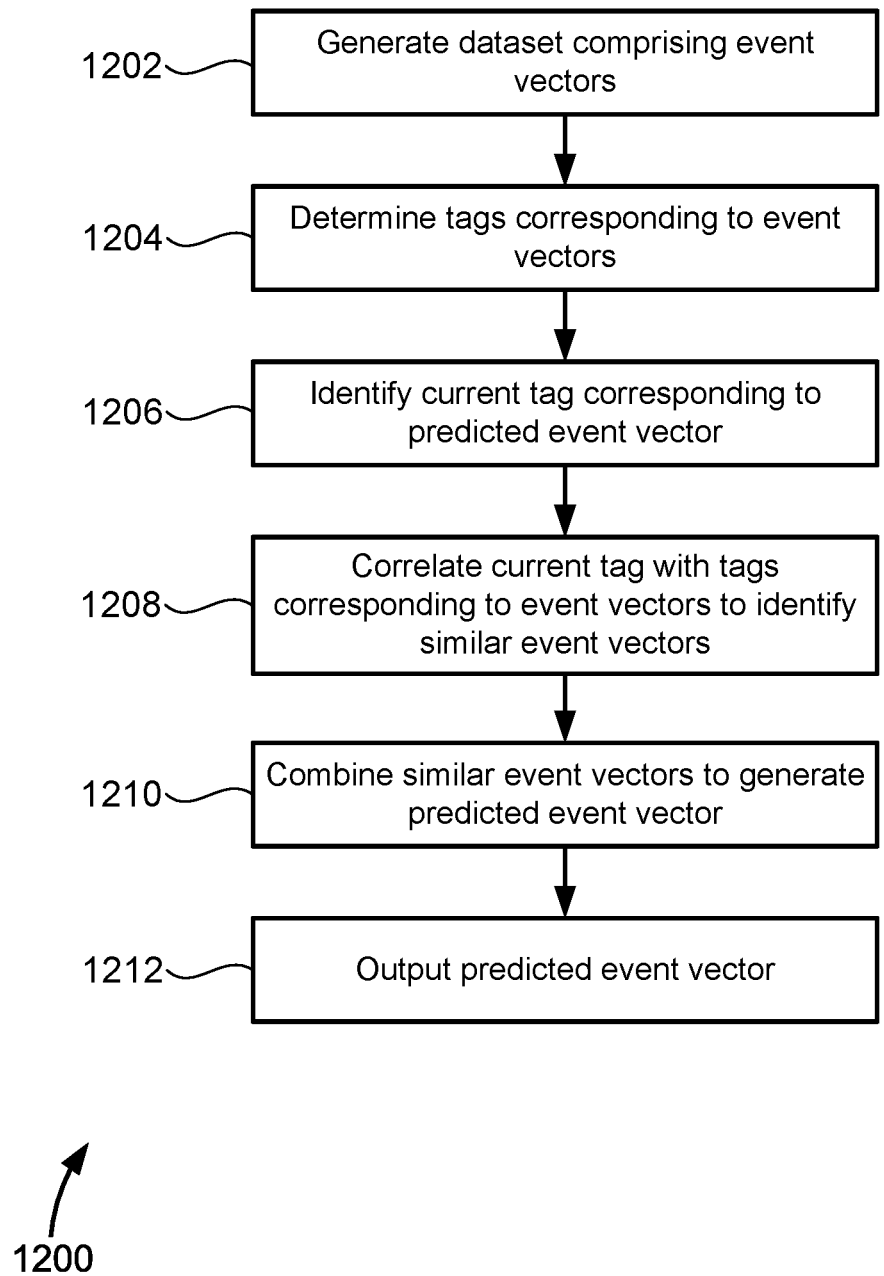
FIG. 12 illustrates a method for generating a predicted event vector, according to an embodiment of the present disclosure.

FIG. 12 illustrates a method 1200 for generating a predicted and/or hybrid event vector 132, according to an embodiment of the present disclosure. At step 1202, a dataset comprising a plurality of event vectors 130 is generated. Each of the plurality of past event vectors 130 comprises one or more past nodes 140 nodes organized by a chronology. At step 1204, at least one tag 160 corresponding to each of the plurality of past event vectors 130 is determined. At step 1206, at least one current tag 160 corresponding to a predicted or hybrid event vector 132, 133 is identified. In some embodiments, step 1206 is performed prior to the predicted/hybrid event vector 132, 133 being generated, thus the at least one current tag 160 corresponding to the predicted/hybrid event vector 132, 133 may correspond to a predicted/hybrid event vector 132, 133 which has only been planned or proposed, and will be generated in a later step (step 1210). At step 1208, at least one current tag 160 is correlated with at least one tag 160 corresponding to each of the plurality of past event vectors 130 to identify a subset of similar past event vectors 130 of the plurality of past event vectors 130. At step 1210, the subset of similar event vectors 130 are combined to generate the predicted/hybrid event vector 132, 133. At step 1212, the predicted event vector 132 is outputted.

Although this embodiment only uses the tags 160 to match vectors, any information from an event vector and the underlying administrative data could be used in other embodiments. For example, the parties involved in the processing map, the contents of the documents filed, trends for similar situations, etc. might be used to generate the predicted/hybrid event vector 132, 133. Machine learning can be used to allow automatic generation of the predicted/hybrid event vector 132, 133. Each event vector has timing between nodes and where predicted values there could also be recorded maximums, minimums, averages, and/or means. The predicted timing may vary with any number of factors.

Figure 13:
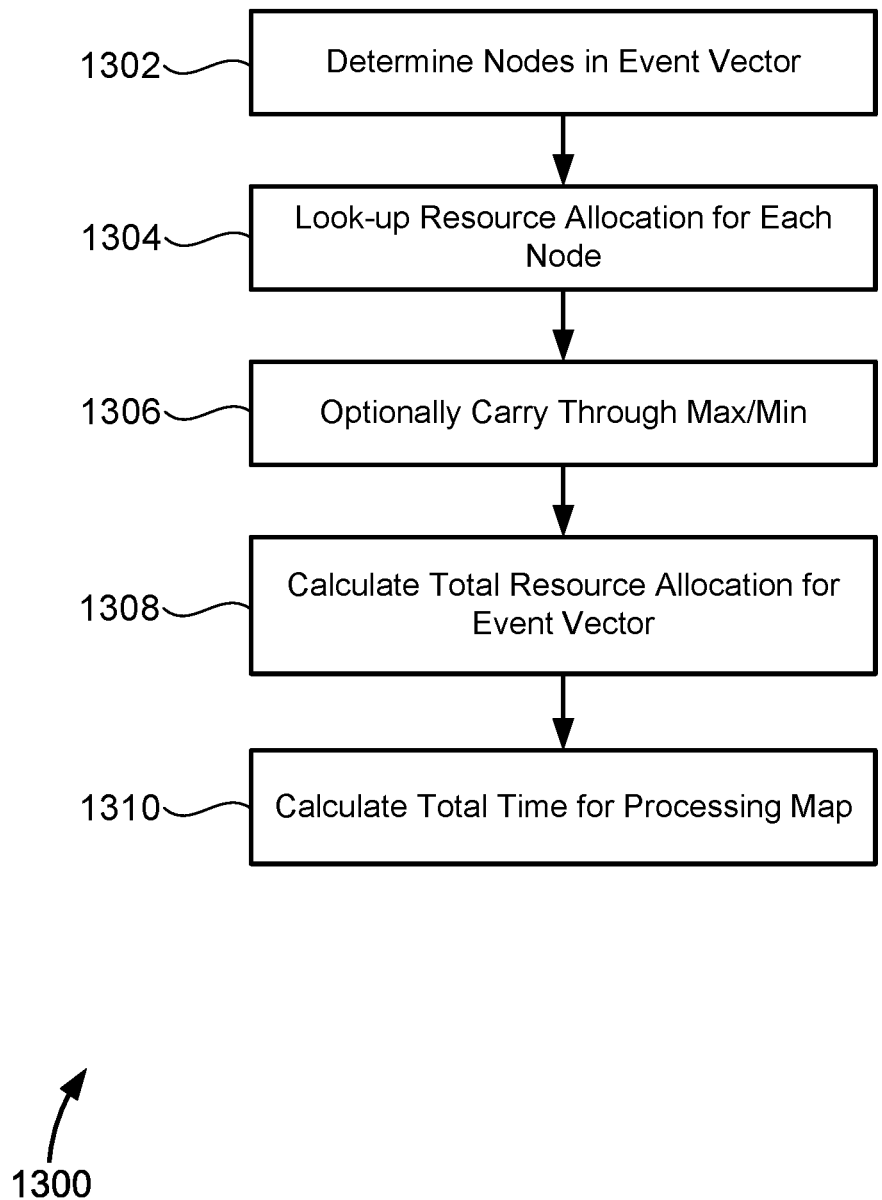
FIG. 13 illustrates a method for generating an allocation vector for a particular processing map and event vector.

FIG. 13 illustrates a method 1300 for generating an allocation vector for a particular processing map 208 and event vector 130, 132, 133. The depicted portion of the diagram beings in block 1302 where the event vector 130, 132, 134 is loaded. Resource allocations for a user, domain, technology, tag, or any other categorization for event vectors may be different. In block 1304, the resource allocation that is relevant for a particular event vector is determined. Machine learning based upon user input, prior invoices, measured resource usage, etc. may be fed into a learning algorithm and when tied to the structure of event vectors, node allocations can be automatically determined. Table II shows one example of a resource allocation for various node labels. For example, a filing node, F, corresponds to a cost of 10,000.

TABLE II

| Resource Allocation | |
|---|---|
| Node | Allocation |
| F | 10,000 |
| OA | 3,000 |
| FOA | 5,000 |
| ... | |
| A | 1,500 |

In block 1306, the minimum, maximum, average, and/or mean for each node can be carried through the process if desired. The total resource allocation for an event vector 1308 is determined in block 1308. This could be a single value or an allocation curve over time. In block 1310, the total time for the event vector is determined, but this could also be represented over time too. In some embodiments, the minimum, maximum, average, and/or mean could be presented optionally and/or over time in addition to the prediction for the total resource allocation.

Figure 14:
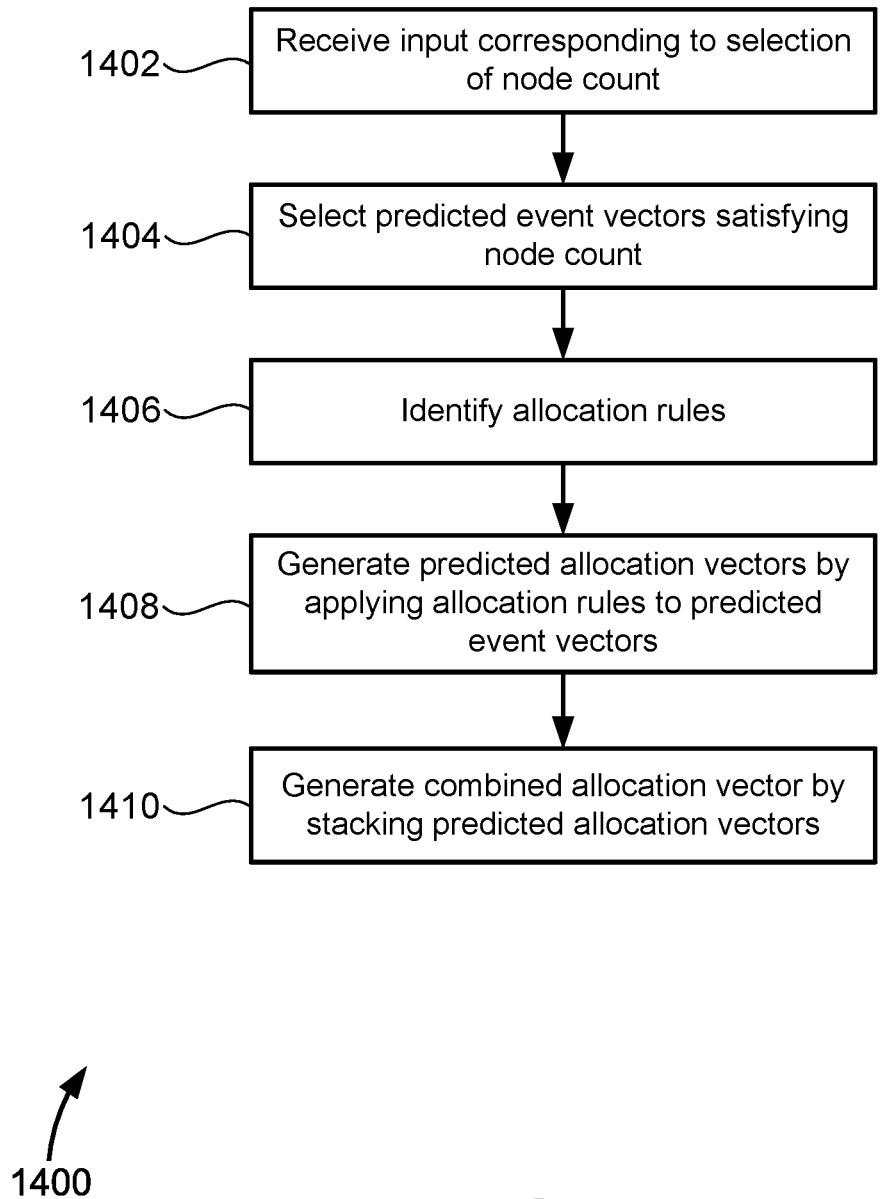
FIG. 14 illustrates a method for generating a combined allocation vector, according to an embodiment of the present disclosure.

FIG. 14 illustrates a method 1400 for generating a combined allocation vector, according to an embodiment of the present disclosure. At step 1402, an input corresponding to a selection of a node count 162 is received. At step 1404, one or more predicted event vectors 132 satisfying the node count 162 are selected. Each of the one or more predicted event vectors 132 comprise one or more nodes organized by a chronology. At step 1406, one or more allocation rules 138 are identified. At step 1408, one or more predicted allocation vectors 136 are generated by applying the allocation rules 138 to the one or more predicted event vectors 132. At step 1410, a combined allocation vector is generated by stacking the one or more predicted allocation vectors 136 along a timeline.

Figure 15:
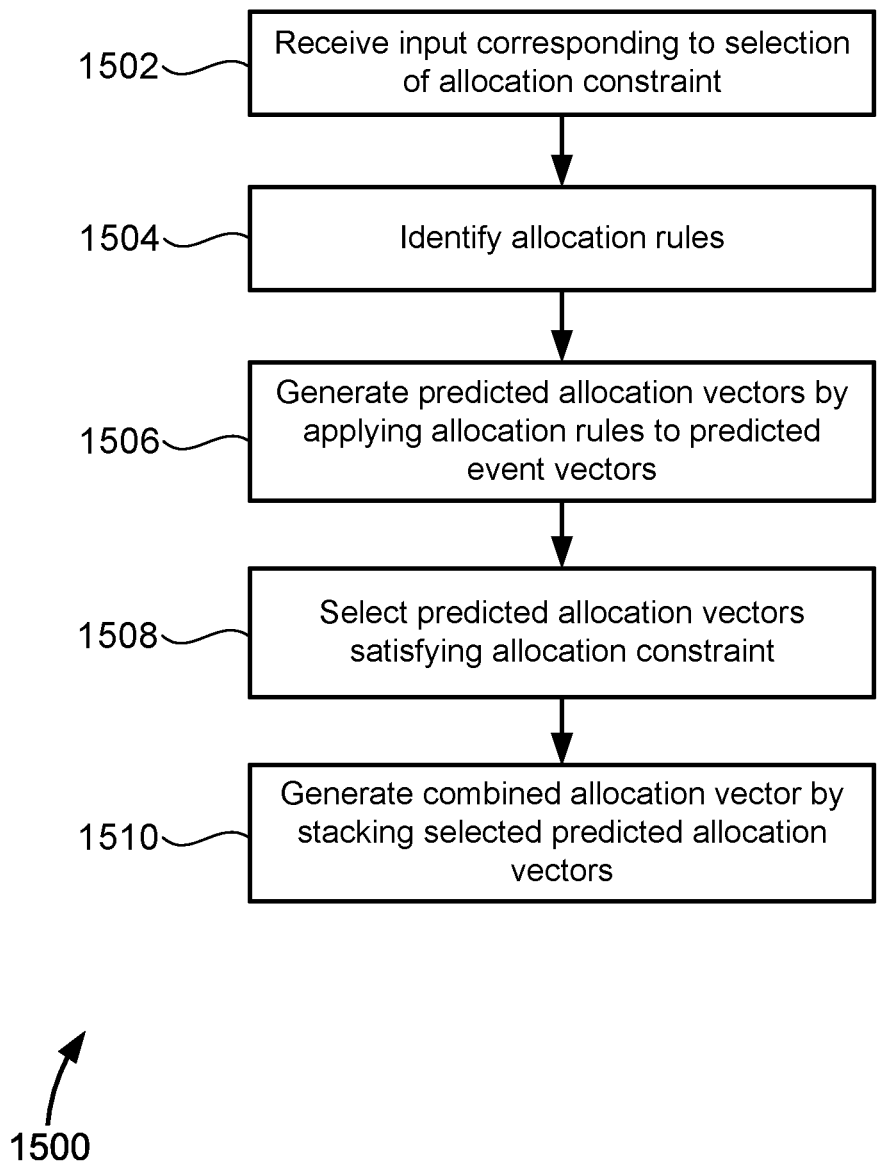
FIG. 15 illustrates a method for generating a combined allocation vector, according to an embodiment of the present disclosure.

FIG. 15 illustrates a method 1500 for generating a combined allocation vector, according to an embodiment of the present disclosure. At step 1502, an input corresponding to a selection of an allocation constraint 164 is received. At step 1504, one or more allocation rules 138 are identified. At step 1506, one or more predicted allocation vectors 136 are generated by applying the allocation rules 138 to one or more predicted event vectors 132. Each of the one or more predicted event vectors 132 comprise one or more nodes organized by a chronology. At step 1508, one or more predicted allocation vectors 136 satisfying the allocation constraint 164 are selected. At step 1510, a combined allocation vector is generated by stacking the selected one or more predicted allocation vectors 136 along a timeline.

In an embodiment of the present disclosure, an algorithm may employ nearby information to improve case predictions. In some cases, the algorithm may weight recent event vectors more heavily than older event vectors to predict future nodes. In other cases, the event vectors of the same or a similar company may be weighted more heavily. Nearby information employed may include the subject matter, actors involved in the processing map, and/or any other administrative information discernable.

Some embodiments determine predicted nodes by navigating different branches of a processing map 208 according to which branch is empirically favored. For example, if further argument or appeal are two branches in a processing map, but further argument would have a 70% chance of a favorable outcome and appeal would have a 40% chance the further argument branch could be used as the next predicted node with that process continuing to build out the remainder of the predicted/hybrid event vector. At each node, it could be randomly determined according to the empirical predictions which outcome actually happened. For example if further argument had a 70% chance of a favorable outcome and a random number chosen between one and one hundred were chosen as sixty-five the predicted/hybrid event vector would record that the favorable outcome actually happened.

In an embodiment of the present disclosure, case prediction based on personnel involved in the processing map may separate a prediction into different stages and how a user handles a case at each stage. In some cases, a recommendation of which stage the user is best as may be provided. The prediction may use statistics of an user in conjunction with other factors to provide a tailored prediction for each case.

In one embodiment, a flat fee pricing may be loaded as the resource allocation table. A flat fee cost model. Recommendations of how a user should traverse to the next future node is provided in some embodiments to allow empirical guidance as the case traverses to future nodes.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A resource management system for allocation of resources for event vectors using machine learning, the resource management system comprising:
a data ingest server comprising a processor and memory with instructions configured to:
download first data from a first source,
authenticate access to a second source, and
download second data from the second source after authenticating;
a vector processing server comprising a processor and memory with instructions configured to generate a dataset comprising a plurality of event vectors, wherein:
the dataset is a function of the first data and the second data,
each of the plurality of event vectors comprise a plurality of nodes spaced in time,
each of the plurality of nodes is selected from a branched processing model of possible nodes,
the second data is partitioned into a domain for the user associated with the event vector, a second plurality of event vectors outside of the domain is deidentified, and
each of the plurality of event vectors traverses the branched processing model of possible nodes in a plurality different ways with different timing; a prediction processing server comprising a processor and memory with instructions configured to: load an event vector, machine match the event vector to a subset of the plurality event vectors,
wherein the machine match is affected by the second plurality of event vectors, and predict future nodes for the event vector through completion as a function of the machine matching; and an allocation server comprising a processor and memory with instructions configured to determine resource allocation for the event vector through completion, wherein the resource allocation is represented with a resource allocation curve showing resources allocated over time.

2. The resource management system for allocation of resources for event vectors using machine learning as recited in claim 1, wherein each node corresponds to resource allocation that defines the allocation curve.

3. The resource management system for allocation of resources for event vectors using machine learning as recited in claim 1, wherein the resource allocation for the event vector through completion includes the predicted future nodes.

4. The resource management system for allocation of resources for event vectors using machine learning as recited in claim 1, wherein the resource allocation includes one or more of a maximum, minimum, average, and mean resource allocation curve showing resources over time for each.

5. The resource management system for allocation of resources for event vectors using machine learning as recited in claim 1, wherein:
at least one or both of the first and second data source are configured for human interaction, and
at least one or both of the first or second data source is scraped by spoofing human interaction.

6. A method for allocation of resources for event vectors using machine learning, the method comprising:
downloading first data from a first source;
authenticating access to a second source;
downloading second data from the second source after authenticating;
generating a dataset comprising a plurality of event vectors, wherein:
the dataset is a function of the first data and the second data,
each of the plurality of event vectors comprise a plurality of nodes spaced in time,
each of the plurality of nodes is selected from a branched processing model of possible nodes, and
each of the plurality of event vectors traverses the branched processing model of possible nodes in a plurality different ways with different timing;
loading an event vector, wherein the second data is partitioned into a domain for the user associated with the event vector;
deidentifying a second plurality of event vectors outside of the domain;
machine matching the event vector to a subset of the plurality event vectors, wherein the machine matching the event vector to a subset is affected by the second plurality of event vectors;
predicting future nodes for the event vector through completion as a function of the machine matching; and
determining resource allocation curve for the event vector showing resources allocated through completion of the event vector.

7. The method for allocation of resources for event vectors using machine learning as recited in claim 6, wherein each node corresponds to a resource allocation configurable by the user to define the resource allocation curve.

8. The method for allocation of resources for event vectors using machine learning as recited in claim 6, wherein the resource allocation for the event vector through completion includes the predicted future nodes.

9. The method for allocation of resources for event vectors using machine learning as recited in claim 6, wherein the determining resource allocation provides one or more of a maximum, minimum, average, and mean resource allocation curve showing resources over time for each.

10. The method for allocation of resources for event vectors using machine learning as recited in claim 6, further comprising:
authenticating access to the first source prior to downloading first data.

11. The method for allocation of resources for event vectors using machine learning as recited in claim 6, further comprising:
authenticating access to the first source prior to downloading first data using a CAPTCHA.

12. The method for allocation of resources for event vectors using machine learning as recited in claim 6, wherein:
at least one or both of the first and second data source are configured for human interaction, and
at least one or both of the first and second data source is scraped by spoofing human interaction.

13. One or more non-transitory machine-readable storage medium having machine-executable instructions configured to perform the machine-implementable method for allocation of resources for event vectors using machine learning of claim 6.

14. A resource management system for allocation of resources for event vectors using machine learning, the resource management system comprising:

one or more processors, and one or memories coupled with said one or more processors, wherein the one or more processors and one or more memories are configured to:

download first data from a first source;

authenticate access to a second source;

download second data from the second source after authenticating;

generate a dataset comprising a plurality of event vectors, wherein:

the dataset is a function of the first data and the second data, each of the plurality of event vectors comprise a plurality of nodes spaced in time, each of the plurality of nodes is selected from a branched processing model of possible nodes, and each of the plurality of event vectors traverses the branched processing model of possible nodes in a plurality different ways with different timing;

load an event vector, wherein the second data is partitioned into a domain for the user associated with the event vector;

deidentify a second plurality of event vectors outside of the domain;

machine match the event vector to a subset of the plurality event vectors;

predict future nodes for the event vector through completion as a function of the machine matching; and determine resource allocation curve for the event vector showing resources allocated over time through completion of the event vector.

15. The resource management system for allocation of resources for event vectors using machine learning as recited in claim 14, wherein the resource allocation for the event vector through completion includes the predicted future nodes to define the resource allocation curve.

16. The resource management system for allocation of resources for event vectors using machine learning as recited in claim 14, wherein nodes of the event vector each have resource allocations specified by the user.

17. The resource management system for allocation of resources for event vectors using machine learning as recited in claim 14, wherein the determining resource allocation provides one or more of a maximum, minimum, average, and mean resource allocation curve showing resources over time for each.

18. The resource management system for allocation of resources for event vectors using machine learning as recited in claim 14, wherein the one or more processors and one or more memories are further configured to:

authenticate access to the first source prior to downloading first data.

19. The resource management system for allocation of resources for event vectors using machine learning as recited in claim 14, wherein the one or more processors and one or more memories are further configured to:

authenticate access to the first source prior to downloading first data using a CAPTCHA.

20. The resource management system for allocation of resources for event vectors using machine learning as recited in claim 14, wherein:

at least one or both of the first and second data source are configured for human interaction, and at least one or both of the first and second data source is scraped by spoofing human interaction.

* * * * *